United States Patent [19]
Yoshikawa

[11] Patent Number: 5,934,783
[45] Date of Patent: Aug. 10, 1999

[54] VENTILATING FAN/LIGHT COMBINATION

[75] Inventor: Hitoshi Yoshikawa, Tajimi, Japan

[73] Assignee: Matsushita Seiko Co., Ltd., Osaka, Japan

[21] Appl. No.: 08/848,635

[22] Filed: Apr. 29, 1997

[30] Foreign Application Priority Data

May 10, 1996 [JP] Japan ................................ 8-115986

[51] Int. Cl.⁶ ........................... F21V 33/00; F21V 29/00; F21S 1/02
[52] U.S. Cl. ........................... 362/96; 362/149; 362/150; 362/294; 362/373
[58] Field of Search ............................. 362/96, 149, 150, 362/218, 253, 294, 373, 404

[56] References Cited

U.S. PATENT DOCUMENTS

| | | | |
|---|---|---|---|
| 3,246,137 | 4/1966 | Zagel | 362/218 |
| 3,419,714 | 12/1968 | Slauer | 362/96 X |
| 4,142,227 | 2/1979 | Aikens | 362/373 X |
| 4,186,433 | 1/1980 | Baldwin | 362/263 |
| 4,356,535 | 10/1982 | Chu | 362/373 X |
| 4,382,400 | 5/1983 | Stutzman | 362/294 X |
| 4,681,024 | 7/1987 | Ivey | 362/294 X |
| 4,701,833 | 10/1987 | Bornhorst | 362/299 |
| 5,537,304 | 7/1996 | Klaus | 362/373 |
| 5,626,416 | 5/1997 | Romano et al. | 362/264 |
| 5,655,877 | 8/1997 | Yu | 362/96 X |
| 5,664,872 | 9/1997 | Spearman et al. | 362/96 |

FOREIGN PATENT DOCUMENTS

| | | |
|---|---|---|
| 56-38250 | 4/1981 | Japan . |
| 63-101735 | 7/1988 | Japan . |
| 4-135117 | 12/1992 | Japan . |
| 1380020 | 1/1975 | United Kingdom ................... 362/373 |

Primary Examiner—Ira S. Lazarus
Assistant Examiner—Ljiljana V. Ciric
Attorney, Agent, or Firm—Wenderoth, Lind & Ponack, L.L.P.

[57] ABSTRACT

A ventilating fan/light combination is provided comprising a fan and a boxlike ventilating fan housing which incorporates the fan and has an opening formed at its lower portion. The ventilating fan housing includes an exhaust port for connection with a duct, and is provided so as to project into a ceiling. The ventilating fan/light combination also includes an illuminating lamp, a lighting unit casing which incorporates the illuminating lamp and is provided at the lower portion of the ventilating fan housing so as to define an air passage in the opening, and a decorative frame which includes a light shielding portion surrounding an outer periphery of the lighting unit casing and has a vent hole communicating with the air passage. The decorative frame has a hollow formed at its lower portion, and a light-transmitting lighting cover is detachably mounted in the hollow of the decorative frame such that light irradiated from the lighting unit casing towards an outer periphery of the decorative frame is shielded by the light shielding portion.

25 Claims, 5 Drawing Sheets

VENTILATING FAN/LIGHT COMBINATION

BACKGROUND OF THE INVENTION

The present invention generally relates to a ventilating fan having a built-in lighting unit (hereinafter referred to as a "ventilating fan/light combination") and, more particularly, to a ventilating fan/light combination which is mainly mounted on a ceiling of a living room, a bathroom or an office. The ventilating fan/light combination is connected with a duct provided in the ceiling which is open to, or communicates with, the outdoors so as to ventilate the living room, the bathroom or the office.

FIG. 7 shows a known ventilating fan/light combination of this kind including a ventilating fan housing 101 formed into a generally boxlike shape. The ventilating fan housing 101 has an opening 102 formed at its lower portion and is attached to a ceiling panel 120. A fan 105 includes a motor 104 to which a vane 103 is fixed. The fan 105 is inserted into the ventilating fan housing 101 so as to be secured to the ventilating fan housing 101 such that a suction port 106 of the fan 104 confronts the opening 102. A decorative laminate 107 is mounted from an indoor side in the opening 102. A lighting unit casing 110 having a light receptacle 108 is fixed to a central portion of the decorative laminate 107 and is provided integrally with a reflector 109.

A fluorescent lamp 111 is detachably mounted on the light receptacle 108. A cord 112 having a power source connector 112a at its distal end extends from the light receptacle 108 such that the power source connector 112a is coupled with a power source receptacle 113 provided in the ventilating fan housing 101. A lighting cover 114 is detachably mounted on the central portion of the decorative laminate 107.

When the known ventilating fan/light combination of the above described arrangement is installed on the ceiling panel 120 and is operated, the ventilating fan housing 101 is initially mounted on the ceiling panel 120. Then, after the power source connector 112a of the cord 112 has been coupled with the power source receptacle 113 provided in the ventilating fan housing 101, the decorative laminate 107 on which the lighting unit casing 110 is integrally mounted is fixed to the ventilating fan housing 101.

However, in this conventional ventilating fan/light combination, the following drawbacks are incurred. These drawbacks are due not only to its general construction, in which the lighting unit casing 110 is provided integrally with the reflector 109, and the lighting unit casing 110 and the lighting cover 114 are mounted on the decorative laminate 107, but also to the construction of the decorative laminate 107 itself. Namely, when the fluorescent lamp 111 is turned on, leakage of light from the lighting unit casing 110 and through a gap between the lighting unit casing 110 and the decorative laminate 107 takes place. Meanwhile, upon inflow of humidity into the lighting unit casing 110, its electrical insulating property deteriorates. Furthermore, since the lighting unit casing 110 is disposed at a central portion of the opening 102 so as to block air flow through the opening 102, the ventilating capability deteriorates. Moreover, since the fluorescent lamp 111 is mounted horizontally, side walls of the lighting unit casing 110 obstruct mounting of the fluorescent lamp 111 on and detachment of the fluorescent lamp 111 from the lighting unit casing 110. Thus, such a problem arises that it is difficult to mount the fluorescent lamp 111 on and detach the fluorescent lamp 111 from the lighting unit casing 110.

SUMMARY OF THE INVENTION

Accordingly, an essential object of the present invention is to provide, with a view to eliminating the above mentioned disadvantages of prior art, a ventilating fan/light combination from which leakage of light is least likely to take place and which has excellent humidity resistance.

In order to accomplish this object of the present invention, a ventilating fan/light combination of the present invention comprises a fan, and a boxlike ventilating fan housing which incorporates the fan and has a connection opening formed at its lower portion. The ventilating fan housing includes an exhaust port connectable with a duct, and is provided so as to project into a mounting surface such as a wall or a ceiling. The ventilating fan/light combination also includes an illuminating lamp, a lighting unit casing which incorporates the illuminating lamp and is provided at the lower portion of the ventilating fan housing so as to define an air passage in the opening, and a decorative frame which includes a light shielding portion surrounding an outer periphery of the lighting unit casing and has a vent hole communicating with the air passage. The decorative frame has a light aperture formed at its lower portion and a translucent, or light-transmitting lighting cover is detachably mounted over the light aperture of the decorative frame such that light emanating from the lighting unit casing towards an outer periphery of the decorative frame is shielded by the light shielding portion.

In accordance with the present invention, a light shielding portion surrounding the outer periphery of the lighting unit casing is provided in the decorative frame. Therefore, light emanating from a side of the lighting unit casing towards the decorative frame is shielded by the light shielding portion. Thus, leakage of light from the decorative frame is prevented. Furthermore, since the lighting unit casing is covered by both the light shielding portion and the lighting cover, entry of moisture into the lighting unit casing can be prevented.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
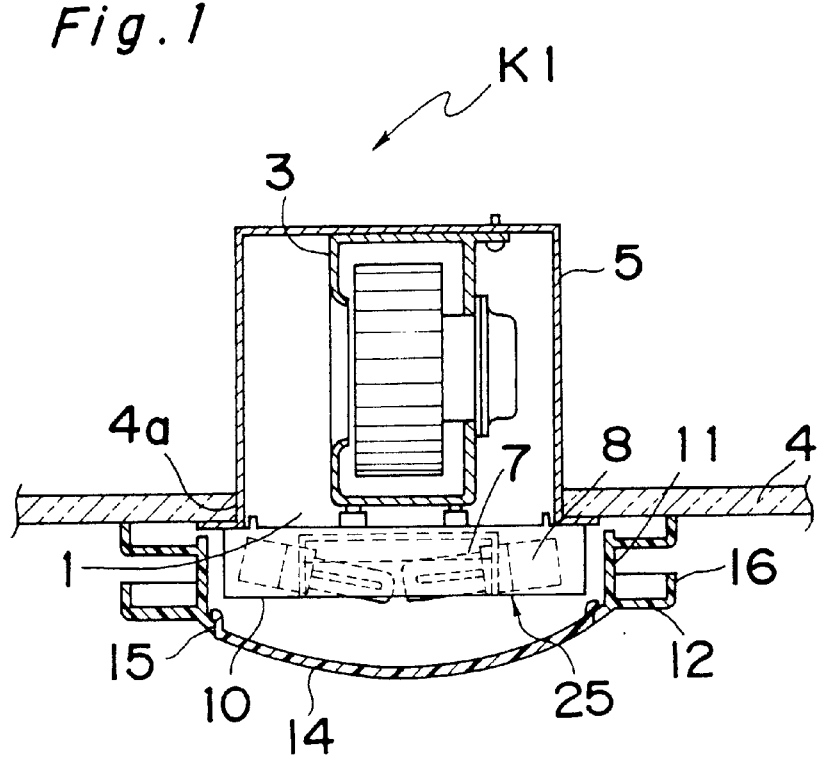
FIG. 1 is a sectional view showing a mounted state of a ventilating fan/light combination according to a first embodiment of the present invention.
Figure 2:
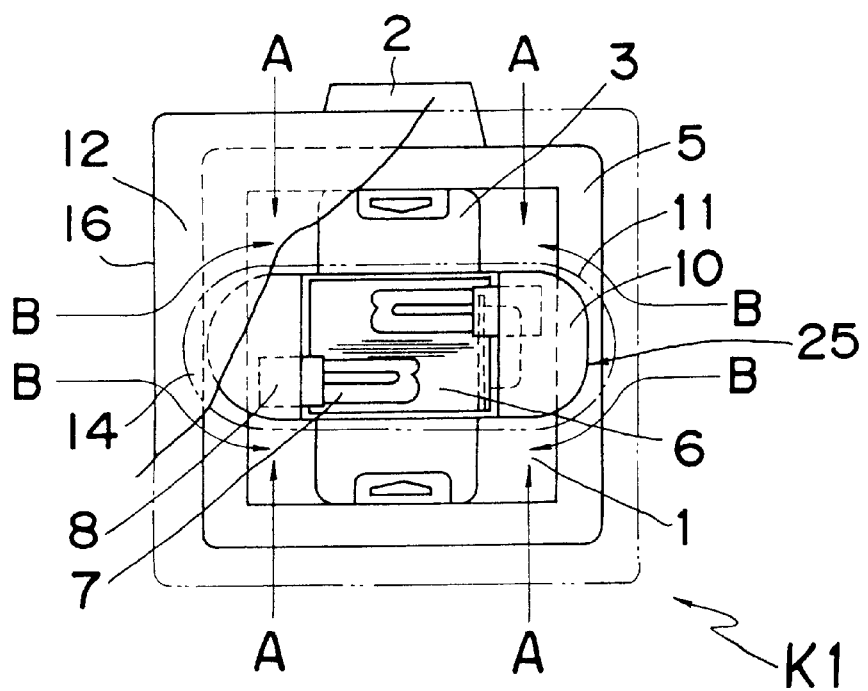
FIG. 2 is a schematic front elevational view of the ventilating fan/light combination of FIG. 1.
Figure 3:
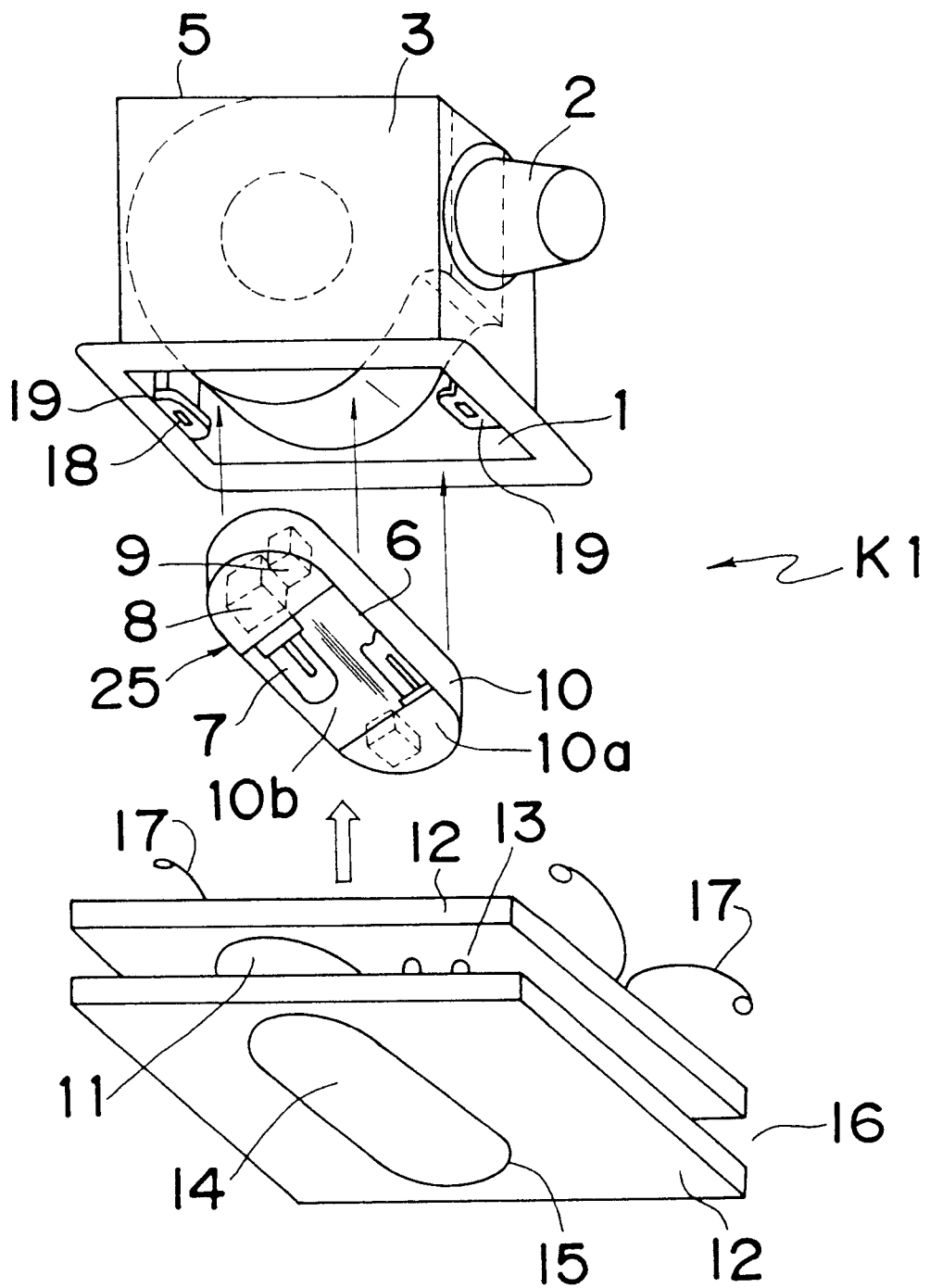
FIG. 3 is an exploded perspective view of the ventilating fan/light combination of FIG. 1.

FIGS. 1 to 5 show a ventilating fan/light combination K1 according to a first embodiment of the present invention. As shown in FIGS. 1 to 3, the ventilating fan/light combination K1 includes a boxlike ventilating fan housing 5. The ventilating fan housing 5 has a connection opening 1 formed at its first end, or lower portion, and includes an exhaust port 2 for connection with a duct (not shown) which is open to, or communicates with, the outdoors. In addition, the ventilating fan housing 5 incorporates a fan 3 and extends through a hole 4a of a mounting surface such as a ceiling panel 4 so as to project into the ceiling.

Figure 4:
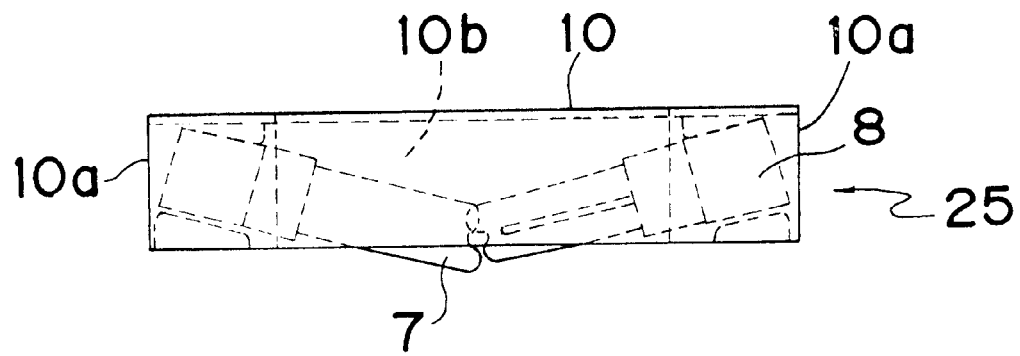
FIG. 4 is a side elevational view of a lighting unit of the ventilating fan/light combination of FIG. 1.
Figure 5:
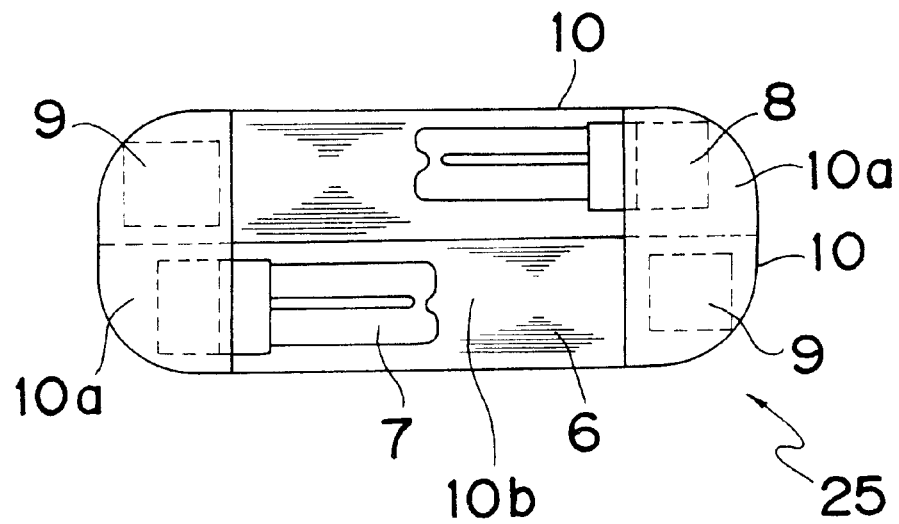
FIG. 5 is a front elevational view of the lighting unit of FIG. 4.

As best shown in FIGS. 4 and 5, a lighting unit 25 includes an elliptic lighting unit casing 10 molded integrally of resin. The lighting unit casing 10 has a pair of bosses 10a disposed at its opposite end portions and a rectangular hollow 10b interposed between the bosses 10a. A reflector 6 is embedded in a bottom wall and side walls of the hollow 10b of the lighting unit casing 10. In addition, a pair of illuminating lamps 7 are provided longitudinally in the hollow 10b such that a distal end portion of each of the illuminating lamps 7 is directed obliquely downwardly as shown in FIGS. 1 and 4. A receptacle 8 and a stabilizer 9 for each of the illuminating lamps 7 are embedded in each of the bosses 10a. As shown in FIGS. 1 and 2, the lighting unit casing 10 is mounted on the lower portion of the ventilating fan housing 5 so as to define an air passage in the connection opening 1, and such that the hollow 10b is directed downwardly.

An elliptic light shielding portion 11 surrounds an outer periphery of the lighting unit casing 10. A plurality of (for example, two) decorative laminates 12 are held by the light shielding portion 11. A suction passage is formed between the decorative laminates 12 such that a vent hole 13 which is open to, or communicates with, the connection opening 1 of the lower portion of the ventilating fan housing 5 is provided. A decorative frame 16 is formed by the light shielding portion 11 and the decorative laminates 12. A light aperture 15, over which a light-transmitting lighting cover 14 is detachably mounted, is formed at a lower portion of the decorative frame 16.

A pair of forked springs 17 which are urged to open are provided on the decorative frame 16 as shown in FIG. 3. A pair of support pieces 19, each having a bore 18 engageable with each of the forked springs 17, are formed on the ventilating fan housing 5 so as to confront the connection opening 1 of the lower portion of the ventilating fan housing 5.

When the ventilating fan/light combination K1 of the above described arrangement is mounted on the ceiling panel 4, the lighting unit casing 10 to which the illuminating lamps 7 are fixed is secured to the lower portion of the ventilating fan housing 5. Then, the ventilating fan housing 5 is mounted on the ceiling panel 4 so as to project into the ceiling. The duct (not shown) which is open to, or communicates with, the outdoors is connected to the exhaust port 2. Each of the springs 17 provided on the decorative frame 16 is brought into engagement with the bore 18 of each of the support pieces 19 provided on the ventilating fan housing 5. This fixes the decorative frame 16 to the ventilating fan housing 5 due to the outwardly directed elastic force of the springs 17.

Then, when the ventilating fan/light combination K1 is operated, air is sucked into the decorative frame 16 in the directions of the arrows A and B shown in FIG. 2. The air flows along the light shielding portion 11 and passes through the vent hole 13 so as to be drawn into the connection opening 1 of the lower portion of the ventilating fan housing 5. As a result, air is discharged outdoors through the exhaust port 2 by the fan 3.

Meanwhile, any sideways irradiation of light from the illuminating lamps 7 in the lighting unit casing 10 is blocked by the light shielding portion 11. Therefore, light from the illuminating lamps 7 proceeds, together with reflected light from the reflector 6 embedded in the lighting unit casing 10, towards the translucent lighting cover 14 provided at the lower portion of the decorative frame 16 so as to perform illumination.

The illuminating lamps 7 are mounted on the receptacles 8 of the lighting unit casing 10 such that the distal end portion of each of the illuminating lamps 7 is directed obliquely downwardly as described above. Therefore, when the illuminating lamps 7 are replaced, they can be mounted on or detached from the receptacles 8 easily without interference from the side walls, etc. of the lighting unit casing 10.

In the ventilating fan/light combination K1 according to the first embodiment of the present invention, by mounting the lighting unit casing 10 and the decorative frame 16 on the ventilating fan housing 5, sideways leakage of light from the lighting unit casing 10 is prevented. In addition, since the lighting unit casing 10 is covered by the light shielding portion 11 of the decorative frame 16 and the lighting cover 14, the entry of moisture into the lighting unit casing 10 is prevented.

Meanwhile, the lighting unit casing 10 is molded integrally of resin such that the receptacles 8 and the stabilizers 9 for the illuminating lamps 7 and the reflector 6 are embedded in the lighting unit casing 10. Therefore, leakage of light from the lighting unit casing 10 itself is prevented, and mounting of the receptacles 8, the stabilizers 9, and the reflector 6 can be performed simultaneously while mounting the lighting unit casing 10.

Furthermore, the light shielding portion 11 surrounding the lighting unit casing 10 is formed into an elliptic shape. Therefore, suction air flows smoothly along the light shielding portion 11 such that air is sucked efficiently from the four outer peripheral areas of the decorative frame 16.

In addition, the receptacles 8 for receiving the illuminating lamps 7 are provided at an angle such that the distal end portion of each of the illuminating lamps 7 is directed obliquely downwardly. Consequently, the illuminating lamps 7 can be mounted on or detached from the receptacles 8 when replacement of the illuminating lamps 7 is necessary.

Figure 6:
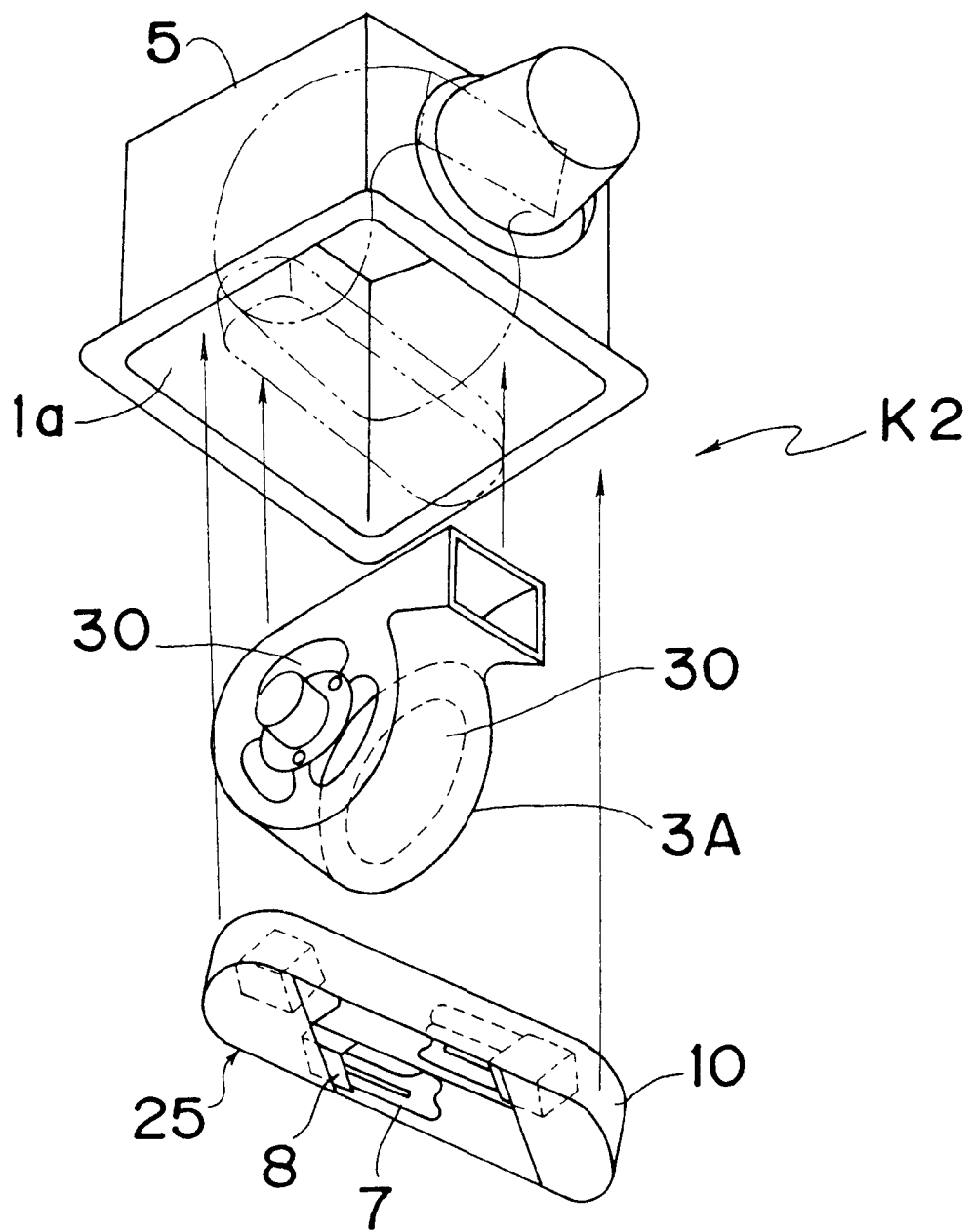
FIG. 6 is an exploded perspective view of a ventilating fan/light combination according to a second embodiment of the present invention.
Figure 7:
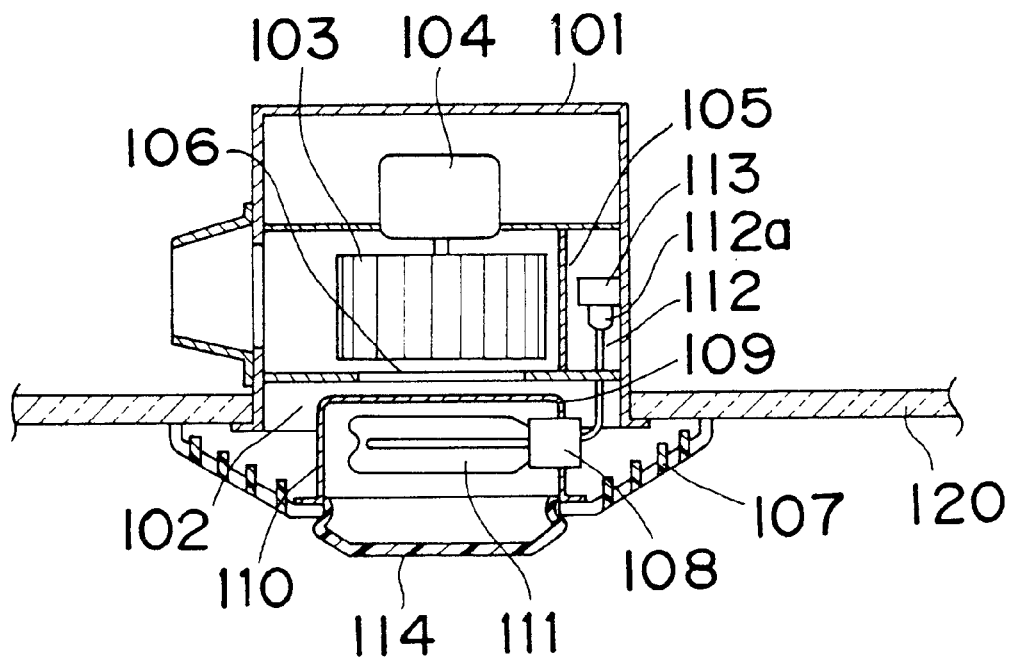
FIG. 7 is a sectional view showing a mounted state of a prior art ventilating fan/light combination (already referred to).

FIG. 6 shows a ventilating fan/light combination K2 according to a second embodiment of the present invention. The ventilating fan/light combination K2 includes a fan 3A of a double-suction type having two suction ports 30. The suction ports 30 are provided at opposite sides of the fan 3A, and the fan 3A is provided in the ventilating fan housing 5 such that the lighting unit casing 10 is longitudinally oriented in the direction of an imaginary line connecting the suction ports 30.

Since the other features of the ventilating fan/light combination K2 are similar to those of the ventilating fan/light combination K1, the description is abbreviated for the sake of brevity. Therefore, although not specifically shown, the ventilating fan/light combination K2 includes the decorative frame 16.

When the fan 3A of the ventilating fan/light combination K2 of the above described arrangement is operated, air is smoothly sucked into the ventilating fan housing 5 via four corners 1a of the connection opening 1 of the lower portion of the ventilating fan housing 5 from the four outer peripheral areas of the decorative frame 16.

In the ventilating fan/light combination K2, air is sucked into the ventilating fan housing 5 by way of the four corners 1a of the connection opening 1 of the lower portion of the ventilating fan housing 5 substantially uniformly from the four outer peripheral sides of the decorative frame 16. Therefore, deterioration of ventilation capability can be prevented.

As is clear from the foregoing description of the ventilating fan/light combination of the present invention, the lighting unit casing is mounted on the ventilating fan housing and the decorative frame, including the light shielding portion surrounding the outer periphery of the side walls of the lighting unit casing, is mounted on the ventilating fan housing. Therefore, sideways leakage of light from the lighting unit casing is prevented and entry of moisture into the lighting unit casing can be prevented.

Meanwhile, since the lighting unit casing is molded integrally of resin or the like and is mounted on the ventilating fan housing, leakage of light from a rear portion of the lighting unit casing can be eliminated.

Furthermore, since the elliptic light shielding portion is provided in the decorative frame so as to cover the outer periphery of the side walls of the lighting unit casing, air flow can be guided uniformly without interference from the lighting unit casing.

In addition, a fan is provided in the ventilating fan housing such that the elliptic lighting unit casing is longitudinally oriented in the direction of an imaginary line connecting the two suction ports of the fan. Therefore, air flow directed towards the opening of the ventilating fan housing is made smoother. Thus, ventilation can be performed smoothly without being blocked by the lighting unit casing.

Moreover, since the receptacles for the illuminating lamps in the lighting unit casing are inclined downwardly, the illuminating lamps can be mounted on or detached from the receptacles safely and easily at the time of replacement of the illuminating lamps.

What is claimed is:

1. A ventilating fan/light apparatus comprising:
   a fan housing to be mounted by projecting through a mounting surface having a first end, a connection opening located at said first end, and an exhaust port for connecting said fan housing to an exhaust duct;
   a fan positioned within said fan housing;
   a lighting unit casing connected to said first end of said fan housing such that at least one air passage is defined within said connection opening;
   at least one illuminating lamp connected to said lighting unit casing;
   a frame connected to said first end of said fan housing;
   wherein said frame has a light aperture, at least one vent hole communicating with said at least one air passage, and a light shielding portion surrounding a periphery of said lighting unit casing;
   wherein said lighting unit casing has a lighting unit casing height, said light shielding portion has a light shielding portion height, and wherein said light shielding portion height is greater than said lighting unit casing height whereby said light shielding portion blocks peripheral light emanating from said lighting unit casing; and
   a translucent lighting cover detachably mounted on said frame such that said light aperture of said frame is covered by said lighting cover.

2. The apparatus of claim 1, wherein said lighting unit casing is integrally molded of resin such that a hollow is formed in said lighting unit casing.

3. The apparatus of claim 2, wherein said lighting unit casing further comprises at least one receptacle for receiving said at least one illuminating lamp, at least one stabilizer for said at least one illuminating lamp, and a reflector in said hollow.

4. The apparatus of claim 3, wherein said at least one receptacle for receiving said at least one illuminating lamp is oriented in an oblique direction such that said illuminating lamp extends at an angle to said lighting unit casing.

5. The apparatus of claim 3, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

6. The apparatus of claim 5, wherein said at least one receptacle for receiving said at least one illuminating lamp is oriented in an oblique direction such that said illuminating lamp extends at an angle to said lighting unit casing.

7. The apparatus of claim 3, wherein said light shielding portion has an elliptical configuration.

8. The apparatus of claim 7, wherein said at least one receptacle for receiving said at least one illuminating lamp is oriented in an oblique direction such that said illuminating lamp extends at an angle to said lighting unit casing.

9. The apparatus of claim 7, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

10. The apparatus of claim 9, wherein said at least one receptacle for receiving said at least one illuminating lamp is oriented in an oblique direction such that said illuminating lamp extends at an angle to said lighting unit casing.

11. The apparatus of claim 1, wherein said light shielding portion has an elliptical configuration.

12. The apparatus of claim 11, further comprising at least one receptacle for receiving said at least one illuminating lamp, wherein said at least one receptacle is oriented in an oblique direction such that said illuminating lamp extends at an angle to said lighting unit casing.

13. The apparatus of claim 11, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

14. The apparatus of claim 13, further comprising at least one receptacle for receiving said at least one illuminating lamp, wherein said at least one receptacle is oriented in an oblique direction such that said illuminating lamp extends at an angle to said lighting unit casing.

15. The apparatus of claim 1, further comprising at least one receptacle for receiving said at least one illuminating lamp, wherein said at least one receptacle is oriented in an oblique direction such that said illuminating lamp extends at an angle to said lighting unit casing.

16. The apparatus of claim 1, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

17. The apparatus of claim 16, further comprising at least one receptacle for receiving said at least one illuminating lamp, wherein said at least one receptacle is oriented in an oblique direction such that said illuminating lamp extends at an angle to said lighting unit casing.

18. A ventilating fan/light apparatus comprising:
- a fan housing to be mounted by projecting through a mounting surface having a first end, a connection opening located at said first end, and an exhaust port for connecting said fan housing to an exhaust duct;
- a fan positioned within said fan housing;
- a lighting unit casing connected to said first end of said fan housing such that at least one air passage is defined within said connection opening;
- wherein said lighting unit casing is integrally constructed such that a hollow is formed in said lighting unit casing;
- at least one illuminating lamp positioned within said hollow in said lighting unit casing;
- wherein said lighting unit casing includes at least one receptacle for receiving said at least one illuminating lamp, wherein said at least one receptacle is oriented in an oblique direction such that said illuminating lamp extends at an angle to said lighting unit casing;
- a frame connected to said first end of said fan housing;
- wherein said frame has a light aperture, at least one vent hole communicating with said at least one air passage, and a light shielding portion surrounding a periphery of said lighting unit casing; and
- a translucent lighting cover detachably mounted on said frame such that said light aperture of said frame is covered by said lighting cover.

19. The apparatus of claim 18, wherein said lighting unit casing further comprises at least one stabilizer for said at least one illuminating lamp, and a reflector in said hollow.

20. The apparatus of claim 19, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

21. The apparatus of claim 19, wherein said light shielding portion has an elliptical configuration.

22. The apparatus of claim 21, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

23. The apparatus of claim 18, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

24. The apparatus of claim 18, wherein said light shielding portion has an elliptical configuration.

25. The apparatus of claim 24, wherein said fan comprises a double-suction fan having a pair of suction ports located on opposite sides of said fan such that an imaginary line is formed connecting said pair of suction ports, and wherein said lighting unit casing is connected to said fan housing such that a longitudinal direction of said lighting casing unit is parallel to the imaginary line.

* * * * *